(12) United States Patent
Wienand et al.

(10) Patent No.: US 8,328,419 B2
(45) Date of Patent: Dec. 11, 2012

(54) TURBOCHARGER PROTECTION DEVICE

(75) Inventors: Karlheinz Wienand, Aschaffenburg (DE); Mario Bachmann, Leimersheim (DE); Matthias Muziol, Mainhausen (DE); Thomas Loose, Linsengericht (DE)

(73) Assignee: Heraeus Sensor Technology GmbH, Hanau (DE)

( * ) Notice: Subject to any disclaimer, the term of this patent is extended or adjusted under 35 U.S.C. 154(b) by 690 days.

(21) Appl. No.: 12/529,484

(22) PCT Filed: Jan. 30, 2008

(86) PCT No.: PCT/EP2008/000717
§ 371 (c)(1), (2), (4) Date: Sep. 1, 2009

(87) PCT Pub. No.: WO2008/104259
PCT Pub. Date: Sep. 4, 2008

(65) Prior Publication Data
US 2010/0091817 A1 Apr. 15, 2010

(30) Foreign Application Priority Data
Mar. 1, 2007 (DE) .......................... 10 2007 010 403

(51) Int. Cl.
*G01K 1/12* (2006.01)
*G01K 7/22* (2006.01)
(52) U.S. Cl. ........................................ 374/181; 374/208
(58) Field of Classification Search ................. 374/141, 374/159, 163, 185, 208
See application file for complete search history.

(56) References Cited

U.S. PATENT DOCUMENTS

| | | | | |
|---|---|---|---|---|
| 4,265,117 A | * | 5/1981 | Thoma et al. | 136/221 |
| 4,453,835 A | * | 6/1984 | Clawson et al. | 374/185 |
| 4,966,469 A | * | 10/1990 | Fraser et al. | 374/208 |
| 5,743,251 A | * | 4/1998 | Howell et al. | 128/200.14 |
| 6,257,758 B1 | * | 7/2001 | Culbertson | 374/120 |
| 6,854,882 B2 | * | 2/2005 | Chen | 374/208 |
| 6,933,166 B2 | * | 8/2005 | Pannek | 438/54 |
| 7,075,407 B1 | * | 7/2006 | Kawamoto et al. | 338/22 R |
| 7,439,845 B2 | * | 10/2008 | Houben et al. | 338/28 |
| 2007/0171959 A1 | * | 7/2007 | Irrgang et al. | 374/185 |
| 2008/0036569 A1 | | 2/2008 | Houben et al. | |

FOREIGN PATENT DOCUMENTS

| | | |
|---|---|---|
| DE | 43 28 197 A1 | 2/1995 |
| DE | 101 58 529 A1 | 8/2002 |
| DE | 102 36 036 A1 | 2/2004 |
| DE | 10 2007 011535 A1 | 3/2008 |
| EP | 1 881 309 A1 | 1/2008 |
| JP | 01312432 A * | 12/1989 |
| JP | 11014469 A * | 1/1999 |

* cited by examiner

*Primary Examiner* — R. A. Smith
(74) *Attorney, Agent, or Firm* — Panitch Schwarze Belisario & Nadel LLP

(57) ABSTRACT

A temperature sensor, particularly a high-temperature sensor, is provided in which an MI line or a heat-decoupling wire is arranged between the measurement resistor (chip) and the supply-line cable. Springs are stuck on the strands of the MI line, whereby the contacting to the measurement resistor is realized, or the heat-decoupling wire is stretched on one side to the end facing the measurement resistor and is connected elastically on the other end to the supply-line cable.

6 Claims, 4 Drawing Sheets

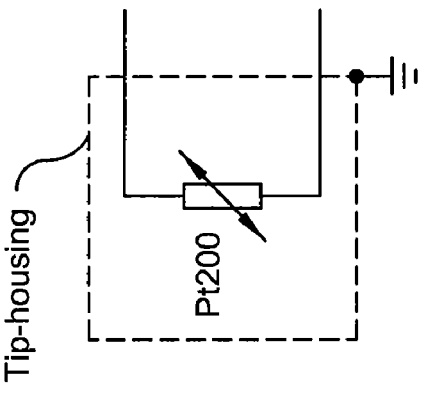
Fig. 5
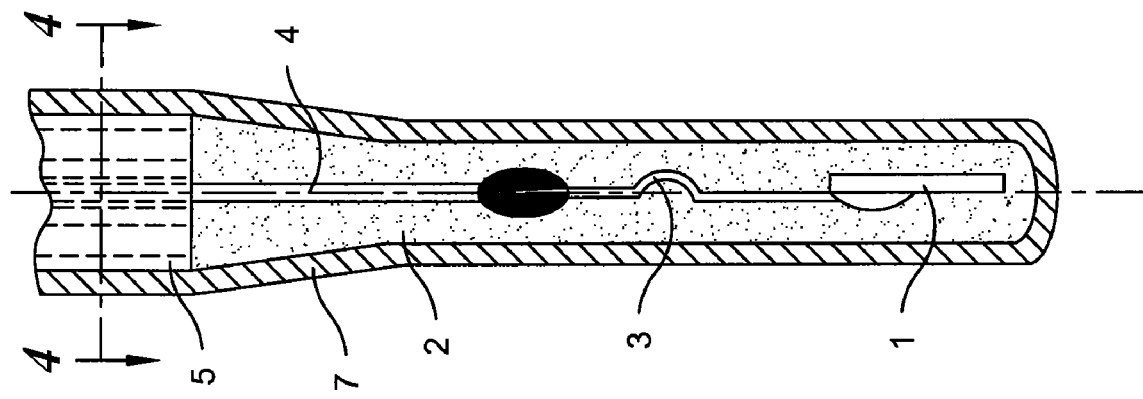
Fig. 3
Fig. 4

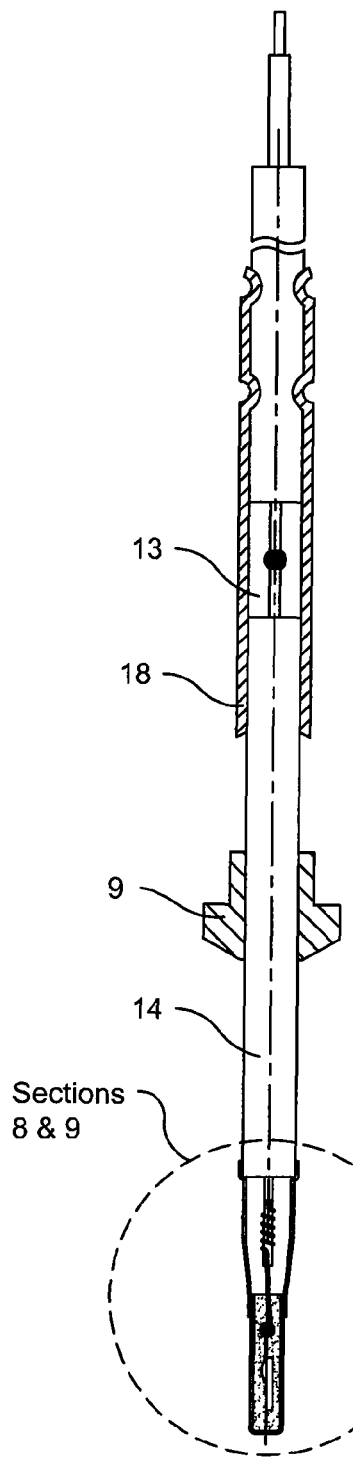
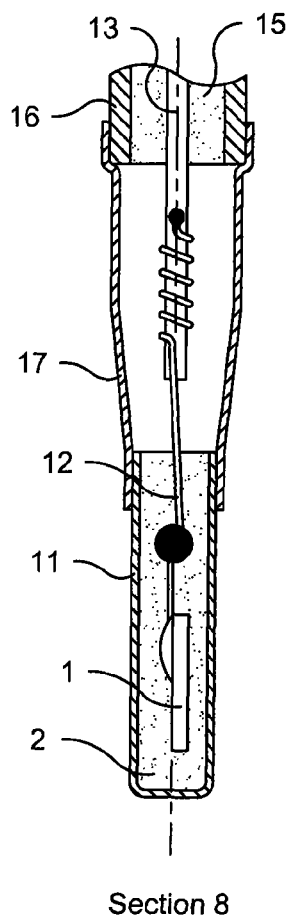
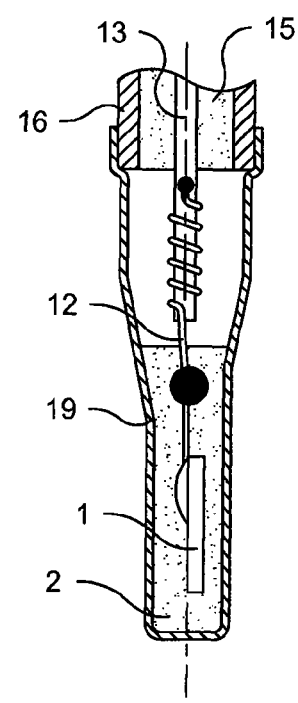
Section 8
Section 9
Fig. 7
Fig. 8
Fig. 9

TURBOCHARGER PROTECTION DEVICE

CROSS-REFERENCE TO RELATED APPLICATIONS

This application is a Section 371 of International Application No. PCT/EP2008/000717, filed Jan. 30, 2008, which was published in the German language on Sep. 4, 2008, under International Publication No. WO 2008/104259 A2 and the disclosure of which is incorporated herein by reference.

BACKGROUND OF THE INVENTION

The invention relates to a turbocharger protection device, to temperature sensors suitable as components for this device, and to methods for their production. Turbochargers must be protected from overheating, which is why they are equipped with an appropriate protection device. For this purpose, switch-off devices are used for diesel turbochargers at 900° C. to 1050° C. and for gasoline engines up to 1120° C.

For gasoline engines, only thermocouples that took advantage of the Seebeck effect were previously used for this purpose. The electronics for this purpose are expensive. Up to 900° C. semiconductor temperature elements (NTC) with simplified electronics are used. One problem with negative temperature characteristics is that, if there is drift, the deactivation takes place at temperatures that are too high and the turbocharger suffers damage.

BRIEF SUMMARY OF THE INVENTION

It is the object of the present invention is to provide a reliable turbocharger protection device that requires lower electronic expense than thermocouples and that can also be used at temperatures between 900° C. and 1200° C., particularly at 1050° C. to 1150° C., and that also eliminates the risks of negative temperature characteristics.

To achieve the object the wear caused by vibrations in the turbocharger due to changes in temperature is reduced by particularly careful lightening of the temperature-dependent elongation work or partially prevented in an insulation. For this purpose, the supply line to the temperature-detection element, particularly a measurement resistor, is stabilized, on one hand, in that the supply line comprises a mineral-insulated supply line part, on whose end facing the temperature detection element, particularly the measurement resistor, strands project out from the insulation, on which the springs are placed that produce the connection between the strands and the temperature detection element, particularly the measurement resistor, or a connection wire located on the temperature detection element, particularly the measurement resistor. Alternatively, between the temperature detection element, particularly the measurement resistor, and a supply-line cable, a heat-decoupling wire is stretched on one side on the end facing the temperature detection element, particularly the measurement resistor, and is connected elastically on the other end to the supply-line cable. In both embodiments, the stresses on the conductor caused by changes in temperature and vibrations between the measurement resistor and the supply-line cable lead to no wear on the conductors, because the stresses are either cushioned or, in the case of mineral insulation, the strands are embedded tightly, so that they cannot generate elongation work and abrasion is excluded. The decisive feature is that the cushioning at high-temperature loads takes place without resonance vibrations perpendicular to the direction in which the elongation is cushioned and not within a high temperature-loaded insulation. Therefore, cushioning takes place according to the invention in the high-temperature range with a spring guided freely on an axis or displacement of the spring outside of the temperature load.

According to the invention, a temperature sensor, particularly a high-temperature sensor, is provided in which the measurement tip can be adapted, particularly bent, according to the requirements of the engine construction. For this purpose, a spring is stuck on the strands of a multi-strand, particularly two-strand, insulated, particularly mineral-insulated, supply line according to the invention, on each strand projecting out of the insulation on the end facing the temperature detection element, particularly the measurement resistor, wherein the springs are respectively connected electrically and mechanically at one end to the strands and are connected at their other end electrically and mechanically to the measurement resistor or a high temperature-stable connection wire of the temperature detection element, particularly the measurement resistor.

According to the invention, simple temperature sensors are also provided, particularly high-temperature sensors, in which a heat-decoupling wire is arranged between the temperature detection element, particularly the measurement resistor, of the chip and the supply-line cable, wherein, according to the invention, the heat-decoupling wire is stretched on one side at the end facing the temperature detection element, particularly the measurement resistor, and is connected elastically to the supply-line cable at the other end.

In particular with this embodiment, a high-temperature sensor element for a turbocharger overheating protection device can be combined, in which a chip is fired in a casting compound within a jacket tube and is connected elastically with bonding wires to heat-decoupling wires, which lead out from the casting compound, wherein the heat-decoupling wires are encased, according to the invention, essentially by a ceramic capillary tube and connected to a spiral-shaped connection cable at their end opposite the chip.

According to the invention, both embodiments relieve stress on the thin heat-resistant connection wires, particularly bonding wires, on the temperature detection element, particularly chip or NTC thermistor, which typically supply the thermosensitive unit with power via pads (contact fields).

These temperature sensors exhibit excellent stability with changes in temperature, particularly with respect to rapid changes in temperature, are suitable as high-temperature sensors, and allow turbocharger overheating protection devices to be operated reliably with simple electronics.

A preferred turbocharger overheating protection device features a high-temperature sensor element for a temperature range from −40 to 1200° C., in which the high-temperature sensor element has a temperature detection element, particularly a chip made of a platinum thin-film measurement resistor on an electrically insulating oxide substrate, which is embedded in a ceramic casting compound and wound electrically with spring-shaped bonding wires on strands of a mineral-insulated supply line according to the invention or connected to heat-decoupling wires, which lead out of the casting compound and, according to the invention, essentially surround the heat-decoupling wires with a ceramic capillary tube and are connected at their end opposite the temperature detection element, particularly a chip, to spiral-shaped connection cables. Instead of the capillary tube, the heat-decoupling wires can also be guided in a powdery or cotton-like dielectric material, for example mineral wool.

In one preferred method for the production of a high temperature sensor element for a turbocharger overheating protection device, in which a temperature detection element, particularly a chip, is fired in a casting compound within a jacket tube and is connected elastically with bonding wires to strands of a mineral-insulated supply line or to heat-decoupling wires, which lead out of the casting compound, according to the invention, the strands are surrounded with the bonding wires, particularly made of Pt or PtRh, or supply lines, particularly made of chromium steel, or the heat-decoupling wires are surrounded essentially by a ceramic capillary tube and connected to spiral-shaped connection cables at their end opposite the temperature detection element, particularly the chip.

The casting compound is an oxide material, particularly ceramic material, preferably a highly pure aluminum oxide. The casting compound is fired in a sleeve. The casting compound mass is thereby sintered and fixes the chip. The sleeve is preferably composed of the same material as the strands or the heat-decoupling wire. In one embodiment that has been proven for especially high temperature applications, particularly between 1000° C. and 1200° C., the sleeve or the strand or the heat-decoupling wire is made of an iron-aluminum-chromium alloy. Preferably, the alloy is composed of 50 to 80, particularly 60 to 75, wt. % Fe, 15 to 40, particularly 20 to 30, wt. % Cr, and 5 to 30, particularly 10 to 20, wt. % Al.

In one embodiment that has been proven for temperature applications up to 1000° C., the sleeve or the strand or the heat-decoupling wire is made of a nickel-chromium alloy. Advantageously, this alloy is composed of 60 to 80, particularly 70 to 75, wt. % Ni, 10 to 25, particularly 15 to 20, wt. % Cr, and 5 to 10 wt. % Fe.

In particular, the mineral-insulated supply line has two strands embedded in casting compound. Analogously, it is especially useful to stretch two heat-decoupling wires on one end and to connect elastically at the respective other ends to each strand of the supply-line cable. The cushioning is realized preferably by an elastic arrangement of the cable, particularly its strands. The heat-decoupling wires are used as electrical conductors between the hot and the cold ends of the measurement tip. The heat-decoupling wires are preferably guided in a ceramic capillary tube over greater than 50%, particularly over 60 to 90%, of their length. The heat-decoupling wires are significantly thicker and longer than the bonding wires. Proven strands or heat-decoupling wires are 0.4 to 1 mm thick, bonding wires or springs 0.1 to 0.25 mm thick.

The measurement resistor is connected with two bonding wires comprising noble metal to the springs, strands, or heat-decoupling wires. The bonding wires are preferably composed of platinum or platinum-rhodium alloy. The bonding wires can be formed as springs on the strand side. The springs can also be composed of a high temperature-resistant electrical conductor, which is connected to the bonding wire or chip.

According to the invention, it was recognized that known high temperature measurement tips used in turbochargers lead to pulling away of the bonding wires after 1000 to 2000 quick temperature changes, due to the lack of resistance to changes in temperature. Therefore, it is essential to the invention to shape the range of thermal decoupling, such that material fatigue due to changes in temperature does not lead to failure of the system. The tension-relieved sensor according to the invention can furthermore be used advantageously in the entire exhaust-gas train, for example as a temperature sensor for particulate-filter monitoring, catalytic converter monitoring, particularly with respect to $NO_x$ catalytic converters, or even with respect to exhaust-gas recirculation.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 3 is a longitudinal section view of an enlarged area of the measurement tip of FIGS. 1 and 2 in the region of the chip;

FIG. 4 a transverse cross section of the measurement tip along line 4-4 in FIG. 3;

FIG. 5 is a schematic diagram of the connection plan of the measurement tip;

FIG. 7 is a longitudinal section view of a high-temperature sensor according to FIG. 6; and FIGS. 8 and 9 are enlarged section views of the detail Sections 8 & 9 in FIG. 7 of the measurement tip according to FIGS. 6 and 7 having a spring placed on a strand.

DETAILED DESCRIPTION OF THE INVENTION

EXAMPLE 1

Temperature sensor whose measurement tip can be adapted, particularly bent, according to the requirements of motor construction.

Figure 6:
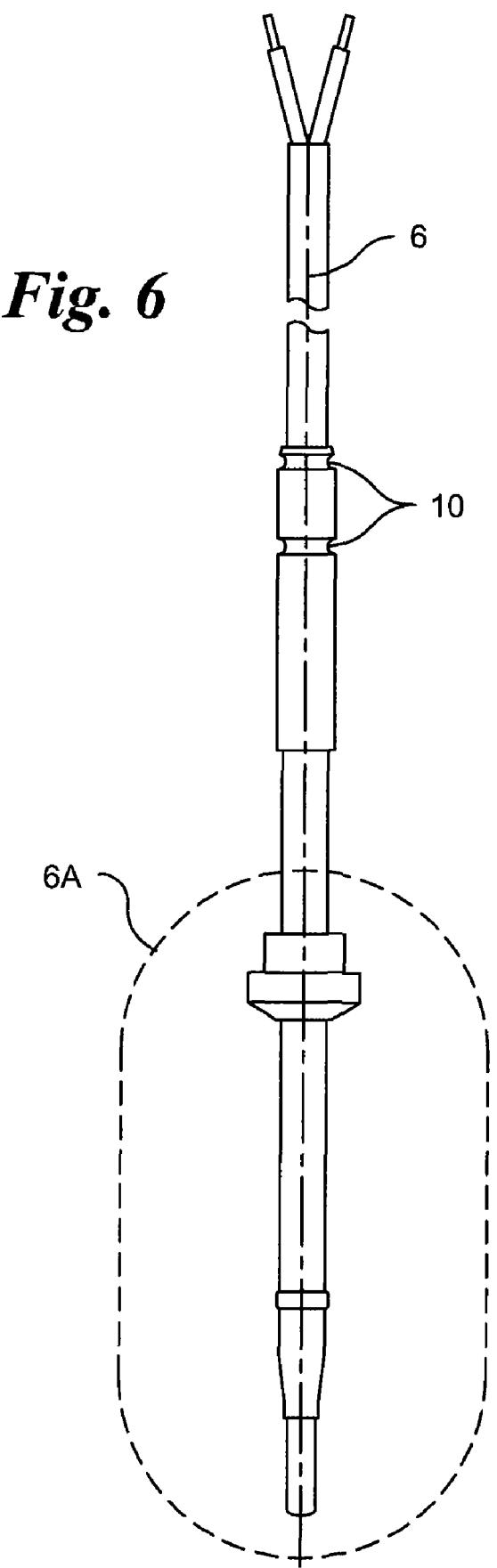
FIG. 6 is a longitudinal view of a high-temperature sensor with flexible measurement tip.

A high temperature sensor with flexible measurement tip has a bendable MI line according to FIG. 6 or 7, on which a measurement tip is arranged, which can be constructed according to FIG. 8 or 9. The film resistor 1 shown in FIG. 8 is connected with two bonding wires (only one shown in Figures) each to a spiral spring, which are each in turn mounted on a strand of an MI line and surround this line.

In this way, the connection between the measurement resistor chip and the supply-line cable is produced at least partially such that, between the measurement resistor and the supply-line cable, strands from a mineral-insulated supply line project out from the mineral insulation at the end facing the measurement resistor and are each connected electrically and mechanically to a spring, and the springs are each guided wound around the strands.

Figure 6A:
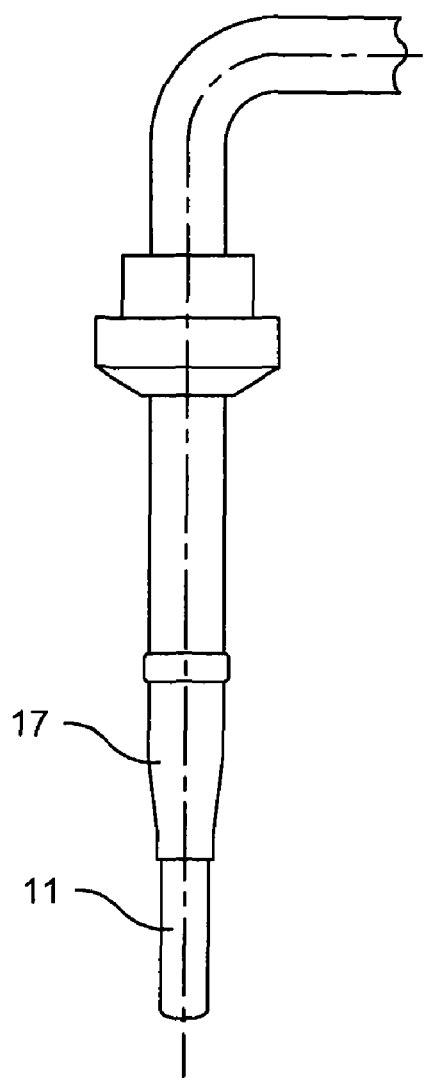
FIG. 6A is an enlarged view of the flexible measurement tip according to the detail 6A in FIG. 6 and showing the tip in bent configuration.

With a 1200° C. resistant film resistor based on the brochure "Platinum Thin-Film Sensors, Which Convince" from Heraeus Sensor Technology GmbH, dated Apr.2006, in particular according to German published Patent Application No. DE 10 2007 046 900.6 (U.S. Patent Application Publication US 2009/0115567 A1) made of a platinum thin-film measurement resistor on a sapphire substrate, in which connection wires are mounted as platinum bonding wires tension-relieved with a fixing drop on a ceramic substrate, a high-temperature sensor element is created for a temperature range from −40° C. to 1200° C. The decisive use temperature for turbochargers currently lies at greater than 1050° C. The film resistor 1 is embedded in a casting compound 2 made of highly pure aluminum oxide in a metal sleeve 11 made of nickel-chromium steel (alloy 602 ca) (61 wt.% Ni, 25 wt.% Cr, 10 wt.% Fe, and 2.2 wt.% Al) and connected electrically with 0.25 mm thick supply line wires 12 formed into springs made of chromium steel with 70 wt.% iron, 25 wt.% chromium, and 5 wt.% aluminum to 0.6mm thick strands 13 of the mineral-insulated line 14 (FIGS. 6A and 7-8). The strands 13 made of nickel-chromium steel with 80 wt.% nickel and 20 wt.% chromium are embedded in a highly compacted mineral powder 15 that is surrounded by a protective metal sleeve 16 made of alloy 601 (60 wt.% Ni, 21 wt.% Cr., 15 wt.% Fe, and 1.2 wt.% Al). The strands 13 of the mineral-insulated line 14 are connected electrically to 0.6 mm thick lines of the connection cable 6 at their end opposite the film resistor 1 (FIGS. 6 and 7).

The spring-shaped supply line wires 12 are stuck according to the invention as spiral springs on the strands 13 of the mineral-insulated line and connected electrically to the strands at their end opposite the film resistor 1. Because the relative change in length between the mineral-insulated line 14 and the film resistor 1 in the metal sleeve 11 leads to breakage in conventional supply line wires in the case of rapid changes in temperature up to the temperature of the turbocharger of 1050° C., according to the invention such a failure of the turbocharger protection device is prevented in that spiral springs guided on the strands considerably weaken the various stresses, particularly the stresses caused by elongation and by vibrations of the vehicle.

The strands 13 of the mineral-insulated line are connected electrically to the spiral-shaped supply line wires 12 and restrict the possible movements of the supply line wire, such that the supply line wire is guided as a spiral spring onto the strands used as axes (FIG. 8). In this way, according to the invention, a pulling off of the supply line wires when vibrations occur is avoided, and a high degree of vibration protection is provided, which allows first an adequate service life for use as a turbocharger protection device.

The metal sleeve 11 made of nickel-chromium steel (alloy 602 ca; 61 wt. % Ni, 25 wt. % Cr, 10 wt. % Fe, and 2.2 wt. % Al) is connected mechanically directly to the MI line 14 or optionally according to FIG. 8 via an intermediate piece 17 made of the same material.

The casting compound 2 made of highly pure aluminum oxide (99.9%) is dosed and fired in a metal sleeve 11. The casting compound mass is thereby sintered and fixes the film resistor 1. The embodiment is especially suitable for high temperature applications, particularly up to 1200° C. In an embodiment proven for temperature applications up to 1000° C., the metal sleeve 11 is composed of a nickel-chromium alloy having 72 wt. % nickel, 16 wt. % chromium, and 8 wt. % iron.

It has been proven useful to push an additional tube 18 partially over the MI line 14 and to weld this tube to this line. The additional tube 18 protects the connection of the strands 13 to the connection cable 6, which is sealed and fixed by two beads 10 in the additionally placed tube. The measurement tip is flexible in the region of the MI line (FIG. 6). The temperature change stability in the supply line wires withstands 10,000 temperature cycles, particularly according to the examples 20,000 temperature cycles for changes in temperature from 100° C. to 850° C. and a time $t_{63}$ of 6 seconds corresponding to a heating rate of 90° K/sec. Therefore, according to the invention, the region of thermal decoupling according to the examples is formed, such that material fatigue due to changes in temperature does not lead to failure of the system. The connection plan according to FIG. 5 shows the connection of the MI line 14 to the casting compound. A flange 9 made of the above nickel-chromium alloy is used for setting an insertion depth of the measurement tip.

EXAMPLE 2

Figure 1:
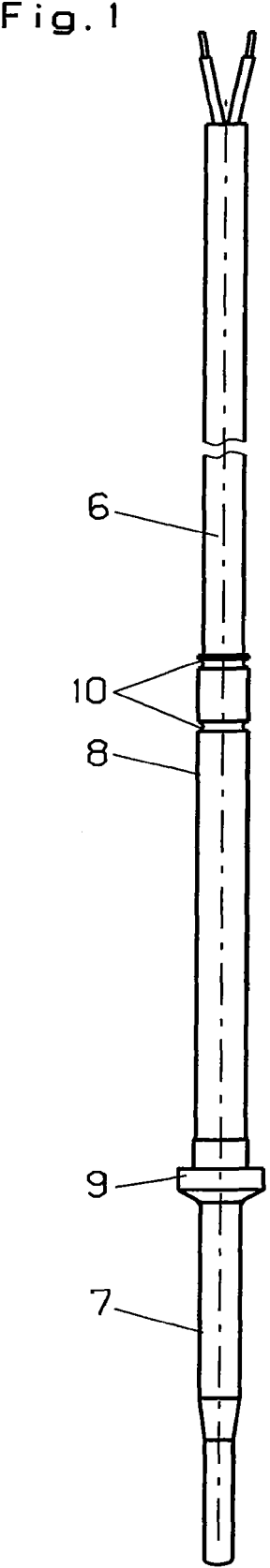
FIG. 1 is a longitudinal view of a measurement tip for use with a temperature sensor according to an embodiment of the invention.
Figure 2:
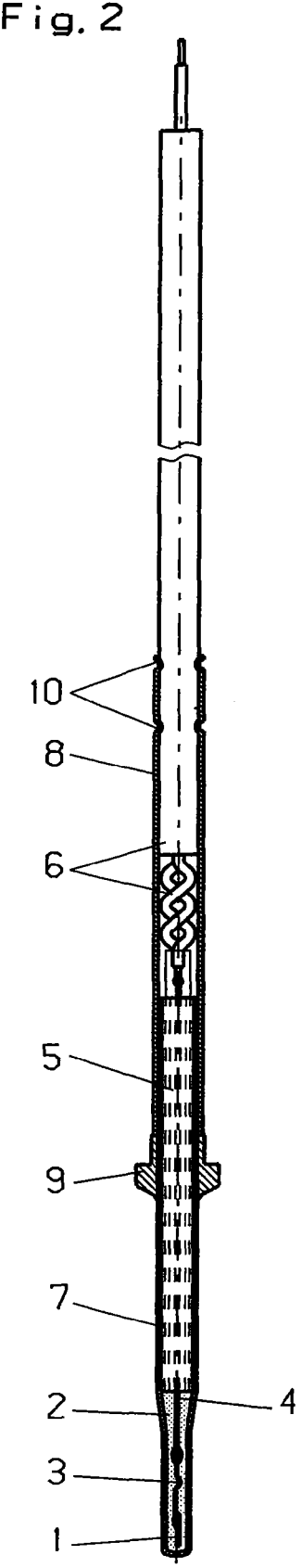
FIG. 2 is a longitudinal section view of the measurement tip from FIG. 1.

With a chip 1 made of a platinum thin-film measurement resistor on a sapphire substrate, a high-temperature sensor element is created for a temperature range from −40° C. to 1200° C. The chip 1 is embedded in a casting compound 2 made of highly pure aluminum oxide and connected electrically with spring-shaped bonding wires 3 made of platinum to heat-decoupling wires 4 made of chromium steel having 70 wt. % iron, 25 wt. % chromium, and 5 wt. % aluminum (FIG. 4). The heat-decoupling wires 4 according to the invention are surrounded essentially by a capillary tube 5 made of aluminum oxide (FIG. 3). On its end opposite the chip 1, the heat-decoupling wires 4 are connected to spiral-shaped strands of the connection cable 6 (FIGS. 1 and 2).

The casting compound 2 is dosed and fired in a sleeve 7 made of chromium steel having 70 wt. % iron, 25 wt. % chromium, and 5 wt. % aluminum. The casting compound mass is thereby sintered and fixes the chip 1. This embodiment is suitable especially for high temperature applications, particularly up to 1200° C. In an embodiment proven for temperature applications up to 1000° C., the sleeve 7 and the heat-decoupling wires 4 are composed of a nickel-chromium alloy having 72 wt. % nickel, 16 wt. % chromium, and 8 wt. % iron.

Preferably, an additional tube 8 is pushed partially over the sleeve 7 and welded to this sleeve. The additional tube 8 protects the connection of the heat-decoupling wires to the connection cable, which is sealed and fixed by two beads 10 in the additional pushed-on tube 8.

The temperature change stability in the bonding wires withstands 10,000 temperature cycles, particularly according to the examples 20,000 temperature cycles for changes in temperatures from 100° C. to 850° C. and a time $t_{63}$ of 6 sec., corresponding to a heating rate of 90° K/sec. Therefore, according to the invention, the region of thermal decoupling according to the examples is formed, such that material fatigue due to changes in temperature does not lead to failure of the system.

The connection plan according to FIG. 5 shows the sleeve 7 connected to the casting compound.

A flange 9 made of the above nickel-chromium alloy is used for setting an insertion depth of the measurement tip.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A high-temperature sensor element for a turbocharger-overheating protection device, the sensor element comprising a chip fired in a casting compound within a jacket tube and connected elastically with bonding wires to strands of a mineral-insulated supply line, which lead out of the casting compound, wherein the bonding wires are wound elastically around the strands.

2. A high-temperature sensor element for a turbocharger-overheating protection device, the sensor element comprising a chip fired in a casting compound within a jacket tube and connected elastically with bonding wires to heat-decoupling wires, which lead out of the casting compound, wherein the heat-decoupling wires are essentially surrounded by a ceramic capillary tube and are connected to spiral-shaped connection cables at their end opposite the chip.

3. A turbocharger overheating protection device, comprising a high-temperature sensor element for a temperature range of −40° C. to 1200° C., the high-temperature sensor element comprising a chip (1) made of a platinum thin-film measurement resistor on an electrically insulating oxide substrate, which is embedded in a ceramic casting compound (2) and is connected electrically with spring-shaped bonding wires (3) to strands, which lead out of the casting compound (2), wherein the bonding wires are wound elastically around the strands.

4. A turbocharger overheating protection device, comprising a high-temperature sensor element for a temperature range of −40° C. to 1200° C., the high-temperature sensor element comprising a chip (1) made of a platinum thin-film measurement resistor on an electrically insulating oxide substrate, which is embedded in a ceramic casting compound (2) and is connected electrically with spring-shaped bonding wires (3) to heat-decoupling wires (4), which lead out of the casting compound (2), wherein the heat-decoupling wires (4) are surrounded essentially by a ceramic capillary tube (5) and are connected to spiral-shaped connection cables (6) at their end opposite the chip.

5. A method for the production of a high-temperature sensor element for a turbocharger overheating protection device, the method comprising firing a chip in a casting compound within a jacket tube, and elastically connecting the chip with bonding wires to strands, which lead out of the casting compound, wherein the bonding wires are wound elastically around the strands.

6. A method for the production of a high-temperature sensor element for a turbocharger overheating protection device, the method comprising firing a chip in a casting compound within a jacket tube, and elastically connecting the chip with bonding wires to heat-decoupling wires, which lead out of the casting compound, wherein the heat-decoupling wires are essentially surrounded by a ceramic capillary tube and are connected to spiral-shaped connection cables at their end opposite the chip.

* * * * *